US008893258B2

(12) United States Patent
Rao et al.

(10) Patent No.: US 8,893,258 B2
(45) Date of Patent: Nov. 18, 2014

(54) SYSTEM AND METHOD FOR IDENTITY BASED AUTHENTICATION IN A DISTRIBUTED VIRTUAL SWITCH NETWORK ENVIRONMENT

(75) Inventors: Sudarshana Kandachar Sridhara Rao, Karnataka (IN); Lilian Sylvia Fernandes, Karnataka (IN)

(73) Assignee: Cisco Technology, Inc., San Jose, CA (US)

( * ) Notice: Subject to any disclaimer, the term of this patent is extended or adjusted under 35 U.S.C. 154(b) by 225 days.

(21) Appl. No.: 13/493,642

(22) Filed: Jun. 11, 2012

(65) Prior Publication Data

US 2013/0332982 A1    Dec. 12, 2013

(51) Int. Cl.
*H04L 29/06*     (2006.01)
*G06F 15/16*     (2006.01)

(52) U.S. Cl.
USPC ............... 726/14; 726/1; 726/4; 709/227

(58) Field of Classification Search
None
See application file for complete search history.

(56) References Cited

U.S. PATENT DOCUMENTS

| | | | | |
|---|---|---|---|---|
| 7,895,642 | B1 * | 2/2011 | Larson et al. | 726/3 |
| 8,271,640 | B2 * | 9/2012 | Salkewicz | 709/223 |
| 8,453,197 | B2 * | 5/2013 | Tai et al. | 726/1 |
| 2009/0276228 | A1 * | 11/2009 | Isaacson | 705/1 |
| 2011/0184993 | A1 * | 7/2011 | Chawla et al. | 707/802 |
| 2011/0185292 | A1 * | 7/2011 | Chawla et al. | 715/760 |
| 2011/0185355 | A1 * | 7/2011 | Chawla et al. | 718/1 |
| 2011/0209064 | A1 * | 8/2011 | Jorgensen et al. | 715/733 |
| 2011/0251992 | A1 * | 10/2011 | Bethlehem et al. | 707/610 |
| 2013/0042115 | A1 * | 2/2013 | Sweet et al. | 713/176 |
| 2013/0074066 | A1 * | 3/2013 | Sanzgiri et al. | 718/1 |
| 2013/0326639 | A1 * | 12/2013 | Droste et al. | 726/28 |
| 2013/0339958 | A1 * | 12/2013 | Droste et al. | 718/1 |

OTHER PUBLICATIONS

Cisco, At-A-Glance Brochure, "Cisco's Highly Secure BYOD Solutions," 2012, 4 pages, http://www.cisco.cornien/US/prod/collateral/vpndevc/ps5712/ps11640/at_a_glance_c45-692412.pdf.
Cisco, Deployment Guide, "Identity-Based Networking Services: IEEE 802.1X Deployment Guide," 2010, 33 pages, http://www.cisco.com/en/US/prod/collateral/iosswrel/ps6537/ps6586/ps6638/guide_c07-627531.pdf.
Cisco, At-A-Glance Brochure, "Cisco TrustSec," 2012, 4 pages http://www.cisco.com/en/US/solutions/collateral/ns170/ns896/ns1051/at_a_glance_c45-653057.pdf.
Cisco, Solution Overview, "Cisco TrustSec Solution Overview," 2012, 10 pages, http://www.cisco.com/en/US/solutions/collateral/ns170/ns896/ns1051/solution_overview_c22-591771.pdf.

(Continued)

*Primary Examiner* — Christopher Revak
(74) *Attorney, Agent, or Firm* — Patent Capital Group (57) ABSTRACT

An example method includes forwarding user credentials from a virtual machine in a distributed virtual switch (DVS) network environment to a network element outside the DVS network environment, receiving a user policy from the AAA server, and facilitating enforcement of the user policy within the DVS network environment. The user credentials may relate to a user attempting to access the VM. In a specific embodiment, the user credentials are provided in a 802.1X packet. In a particular embodiment, a network access control (NAC) in the DVS network environment forwards the user credentials, receives the user policy, and facilitates the enforcement of the user policy. In one embodiment, the NAC is provisioned as another VM in the DVS network environment.

20 Claims, 4 Drawing Sheets

(56) References Cited

OTHER PUBLICATIONS

Cisco, White Paper, "Cisco Any Device: Planning a Productive, Secure, and Competitive Future," 2011, 12 pages, http://www.cisco.com/web/about/ciscoitatwork/downloads/ciscoitatwork/pdf/any_device_white_paper.pdf.

Citrix, White Paper, "Citrix Reference Architecture for Multi-Tenant Desktop as a Service," 2011, 56 pages, http://www.citrix.com/wsdm/restServe/skb/attachments/RDY4015/Citrix%20Reference%20Architecture%20for%20Multi-Tenant%20Desktop%20as%20a%20Service-V2.pdf.

Citrix, White Paper, "Top 10 Considerations—Delivering Desktops in the Cloud, a DaaS Guide for System Integrators," 2011, 31 pages, http://support.citrix.com/servlet/KbServlet/download/26748-102-665157/Top%2010%20Considerations%20-%20Delivering%20Desktops%20in%20the%20Cloud.pdf.

Wyse Technology, Press Release, "Wyse Extends its Leadership in Healthcare Industry with Innovative Security Solutions around Strong Authentication and Single Sign-on for Roaming Virtual Desktops," May 1, 2012, 2 pages, http://www.wyse.com/about/press/release/1970.

Cisco, "Cisco TrustSec 2.0: Design and Implementation Guide," Nov. 29, 2011, 178 pages, http://www.cisco.com/en/US/docs/solutions/Enterprise/Security/TrustSec_2.0/trustsec_2.0_dig.pdf.

* cited by examiner

SYSTEM AND METHOD FOR IDENTITY BASED AUTHENTICATION IN A DISTRIBUTED VIRTUAL SWITCH NETWORK ENVIRONMENT

TECHNICAL FIELD

This disclosure relates in general to the field of communications and, more particularly, to a system and a method for identity based authentication in a distributed virtual switch network environment.

BACKGROUND

A trend towards virtualization in the information technology (IT) arena is driving the development of many virtualization technologies, such as network virtualization. Network virtualization solutions can consolidate multiple physical networks into one virtual network. They can also logically segment a single physical network into multiple logical networks. Partitions can be added to rapidly scale the network for business needs. Network virtualization represents a new IT paradigm, challenging existing physical network deployment models. Network virtualization offers many benefits, such as expanding the availability of single IT assets to multiple users, managing multiple IT assets as a single resource, providing dedicated virtual networks for applications, etc. This can lead to revenue generation, expense reduction, and enhanced customer satisfaction.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

An example method includes forwarding user credentials from a virtual machine in a distributed virtual switch (DVS) network environment to a network element (e.g., an Authentication, Authorization, and Accounting (AAA) server) outside the DVS network environment, receiving a user policy from the AAA server, and facilitating enforcement of the user policy within the DVS network environment. In this context, the term 'facilitating' can include messaging, signaling, assisting, evaluating, or otherwise processing information in order to aid in the enforcement of the user policy. The user credentials may relate to a user attempting to access the VM. In a specific embodiment, the user credentials are provided in a 802.1X packet.

In a particular embodiment, a network access control (NAC) in the DVS network environment forwards the user credentials, receives the user policy, and facilitates the enforcement of the user policy. In one embodiment, the NAC is provisioned as another VM in the DVS network environment. The DVS network environment can include a plurality of tenants, with the NAC and the AAA server being controlled by a common tenant. In particular embodiments, facilitating enforcement of the user policy can involve forwarding the user policy to a virtual Ethernet module (VEM) that can enforce the user policy.

In some embodiments, the user policy may include network configuration information based on the user credentials, including user profiling, user workspace management, and user identity management. The user policy may also include information related to access control lists (ACLs), virtual local area networks (VLANs), virtual eXtensible local area networks (VXLANs), and security groups that are authorized to be accessed by the user.

Example Embodiments

Figure 1:
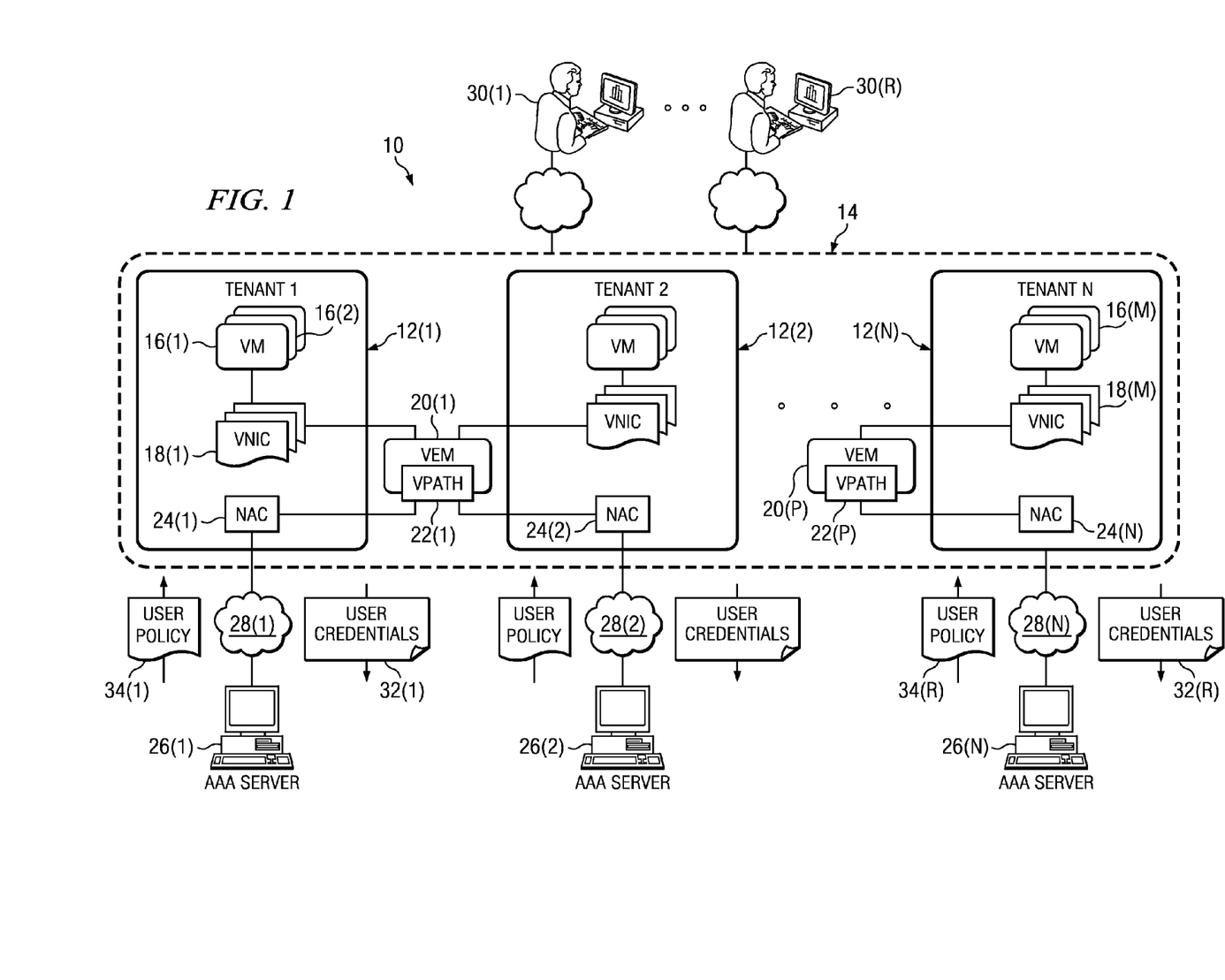
FIG. 1 is a simplified block diagram illustrating a communication system for identity based authentication in a distributed virtual switch network environment according to an example embodiment.

Turning to FIG. 1, FIG. 1 is a simplified block diagram illustrating a communication system 10 for identity based authentication in a distributed virtual switch network environment in accordance with one example embodiment. FIG. 1 illustrates one or more tenants 12(1)-12(N), who subscribe to a distributed virtual switch (DVS) network 14. As used herein, the term "tenant" can include a subscriber (e.g., company, department, organization, enterprise, region, customer, person, etc.) that subscribes to and/or uses compute, storage, and network resources of DVS network 14. Tenants 12(1)-12 (N) may be differentiated from each other based on respective service profiles.

Computing, storage, and network resources of tenants 12(1)-12(N) may be logically grouped into separate zones in certain example implementations of the present disclosure. It may be noted that the actual compute, storage, and network resources used by tenants 12(1)-12(N) may be physically provisioned over common hardware, such as server computers, switches, and other network elements that are shared among tenants 12(1)-12(N). As used herein, the term "network element" is meant to encompass computers, network appliances, servers, routers, switches, gateways, bridges, load balancers, firewalls, processors, modules, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information.

DVS network 14 is a collection of hardware and software ("cloud infrastructure") forming a shared pool of configurable computing resources (e.g., networks, servers, storage, applications, services, etc.) that can be suitably provisioned to provide on-demand self-service, network access, resource pooling, elasticity and measured service, among other features. In one example, DVS network 14 may represent a cloud infrastructure configured to run a single instance of software architecture that hosts multiple separate zones, each of which can server a separate group of users with a specific service profile corresponding to the respective tenant's service profile.

DVS network 14 may include security features that separate and secure multi-tenant traffic and interactions. For example, in an enterprise context, tenants 12(1)-12(N) may be departments of an organization operating under a common domain private cloud. Each department may have different computational needs, applications, or storage scale. Traffic from and to the various departments and user access control may be segregated within DVS network 14. In another example of a service provider (SP) context, tenants 12(1)-12(N) can be different enterprises that lease and/or use the SP cloud infrastructure in a shared public cloud environment. Each of these enterprises can have distinct computation, application, and storage needs. Each tenancy may be enforced for security, usage, service level agreement (SLA) conformance, for example, to satisfy the tenants' requirements and the hosting SP business requirements.

Tenants 12(1)-12(N) may subscribe to one or more virtual machines (VMs) 16(1)-16(M), which may communicate through respective virtual Network Interface Cards (vNICs) 18(1)-18(M). As used herein, a "virtual machine" can include a software implementation that executes programs like a physical machine (e.g., computer). VMs may include system VMs, providing a complete system platform with operating system to run multiple applications. VMs may also include process VMs, configured to run a single program (or process). vNICs 18(1)-18(M) may simulate a network interface card, including having their own Media Access Control (MAC) addresses. VMs 16(1)-16(M) may be provided with dedicated switch ports by virtual Ethernet modules (VEMs) 20(1)-20(P), which include respective vPath 22(1)-22(P). VEMs 20(1)-20(P) provide advanced networking and security, switching between directly attached VMs, and uplinking to the rest of DVS network 14. Traffic may be switched between VMs locally at each VEM instance.

In a general sense, vPath 22(1)-22(P) can run virtualized services within DVS network 14, such as: intelligent steering of traffic to virtual service nodes (VSNs); dynamic policy provisioning and enforcement; redirecting traffic to tenant nodes based on the flow destination, etc. vPath 22(1)-22(P) may decouple VMs 16(1)-16(M) from policy enforcement, and instead provide a more centralized approach to provisioning services within DVS network 14. For example, unknown packets may be forwarded by VEMs 20(1)-20(P) to appropriate virtual security gateways (VSGs) provisioned in tenants 12(1)-12(N) for policy information. VSGs may send the appropriate security policy enforcement actions to VEMs 20(1)-20(P). From there, security policies may be handled in vPath 22(1)-22(P) by respective VEMs 20(1)-20(P).

Tenants 12(1)-12(N) may further include network access controls (NACs) 24(1)-24(N) that communicate with VEMs 20(1)-20(P). NACs 24(1)-24(N) may communicate with respective Authentication, Authorization, and Accounting (AAA) servers 26(1)-26(N) over third party cloud networks 28(1)-28(N), such as the Internet. In various embodiments, AAA servers 26(1)-26(N) are located outside DVS network 14. According to embodiments of communication system 10, NACs 24(1)-24(N) can communicate with respective AAA servers 26(1)-26(M) to authenticate and authorize users 30(1)-30(R) on VMs 16(1)-16(M). Users 30(1)-30(R) can be humans, or human agents (e.g., software agents) who are identifiable by corresponding user credentials 32(1)-32(R).

As used herein, the term "user credentials" can include information supplied by the user to access a VM in DVS network 14, for example, username, password, site key, personal identification number (PIN), VM's Media Access Control (MAC) address, etc. User credentials may also include information pertaining to the VM on which access is attempted. In some embodiments, user credentials can be unique to the user-VM pair, such that an access attempt by a specific user to a specific VM can be distinguished from another access attempt: (i) by another user to the specific VM; and (ii) by the specific user to another VM. In some embodiments, user credentials may be unique to the user. In such embodiments, the user's access attempts to various VMs may be indistinguishable from each other; however, the specific user's access attempts may be distinguished from access attempts by other users.

At a high level, user credentials 32(1)-32(R) can be passed from VMs 16(1)-16(M) to NACs 24(1)-24(N) via vPath 22(1)-22(P). NACs 24(1)-24(N) may communicate user credentials 32(1)-32(R) to respective AAA servers 26(1)-26(N) to authenticate users 30(1)-30(R). The authorization information from AAA servers 26(1)-26(N) may be in a form of user policy 34(1)-34(R), which can include permissions and privileges for respective users 30(1)-30(R) to access resources within DVS network 14. User policy 34(1)-34(R) can be applied to VMs 16(1)-16(M) via vPath 22(1)-22(P). As used herein, the term "user policy" can include attributes (e.g., IP address or subnet, VM name, VM guest operating systems, zone name, cluster names, etc.) that may be used to create or enforce access rules for the user. User policy 34(1)-34(R) may be in any form, including a Remote Authentication Dial In User Service (RADIUS) packet, DIAMETER packet, Extensible Markup Language (XML), or other formats. User policy 34(1)-34(R) may include access control lists (ACLs), virtual local area network (VLAN), virtual extensible local area network (VXLAN) and security groups that are authorized for respective uses 30(1)-30(R).

User policy 34(1)-34(R) may be propagated to VEMs 20(1)-20(N) for use with other network services, such as Virtual Security Gateway (VSG), Virtual Application Control Engine (vACE), and Virtual Wide Area Application Services (vWAAS). In some embodiments, keys (or cookies) may be generated at NACs 24(1)-24(N) and propagated to VEMs 20(1)-20(P) and to network services, as needed, for example, through vPath 22(1)-22(P). Thus, user identities can be maintained across VMs 16(1)-16(M) and other network services used by users 30(1)-30(R). Identity and network policy changes for different users 30(1)-30(R) can also be applied through NACs 24(1)-24(N). Resource usage can be minimized, for example, by using the same desktop with a different user policy across various network services.

For purposes of illustrating the techniques of communication system 10, it is important to understand the communications that may be traversing the system shown in FIG. 1. The following foundational information may be viewed as a basis from which the present disclosure may be properly explained. Such information is offered earnestly for purposes of explanation only and, accordingly, should not be construed in any way to limit the broad scope of the present disclosure and its potential applications.

Virtualization is increasingly being used in data center networks. In particular, virtual desktop infrastructure (VDI) is gaining popularity. In VDI, the personal computer (PC) is disaggregated; the keyboard, video, and mouse stay with the user at an endpoint, and the compute and storage capabilities are moved to the data center. The endpoints at the user-end may be any variety of devices (e.g., thin clients); applications are hosted wherever the best user experience is offered (e.g., locally at endpoint or data center). Access from the endpoint to the logical desktop (at the data center) is delivered through the network. Typically, the user accesses a specific VM in the data center that acts as the user's virtualized desktop. VDI presents challenges in authorization and authentication of users, and application of different policies to the same or different VMs.

Typically, in VDI, several components (e.g., storage infrastructure, database servers, network connectivity management, authentication mechanisms and provisioning services) may be shared across multiple tenants, for example, to achieve economies of scale. Other components (e.g., individual VMs, application databases, tenant user accounts, customer domain authentication, network connectivity within the tenant domain, and profile data) may be dedicated to each tenant, for example, to provide secure, customized environments. In such partially shared and partially dedicated network context, tenants may successfully access specific backend systems when suitable authentication infrastructure is provided to enable individual users to run their sessions within the appropriate security context. Such services may be enabled when the user account, used for launching a session to a virtual desktop, has access rights to the backend systems within the data center.

In some cloud infrastructure implementations, users and devices may be identified as they connect to the cloud network, and some differentiated services may be provided to such users and devices. Policies may be enforced for generally identifiable consumer and network-capable devices (e.g., iPhones, laptops, etc.). Traditional 802.1X, web authentication (WebAuth), and MAC Authentication Bypass (MAB) may be used to ascertain identity of users and devices on the network. The network automatically identifies and classifies devices by collecting endpoint data through built-in probes or network-based device sensors on the switching and wireless infrastructure, and further refines the classification with directed, policy based active endpoint scanning technology. Sponsored guests receive restricted access to specific resources (e.g., files, printers, etc.) through a customized web portal. Internal network access is blocked, and activity is tracked and reported.

However, such authentication mechanisms may provide authentication on a network level (e.g., merely to access the network), and may not provide finer grained authentication mechanisms at the tenant level (e.g., restrict access within each tenant zone to specified services or domains for specific users). Thus, if a user gains access to the network other than as a sponsored guest, the user can access all network resources, according to the corresponding service level agreement. Thus, there is no differentiation in access between an IT administrator and a general user of a specific tenant; the differentiation may be merely between an authorized tenant user and a sponsored guest of the network.

Currently, some mechanisms exist to extend customization to the user level, allowing individual users to connect to specific VMs and access specific services, for example, based on their user login and password that can launch a virtual desktop session. User customization may include, for example, cookies from web browsing sessions; software settings specific to the user; and such other customized configuration settings. One customization mechanism involves tenant supplied domain controllers (e.g., AAA servers) deployed within DVS network 14 to facilitate authentication and operations of customer applications. Although each tenant may want to control its domain controller within the cloud network, the service providers may not want to relinquish control over a portion of their network to tenants, for various business (and security) reasons.

In a similar approach, the cloud service provider may offer a separate vApp (a collection of VMs) to each tenant using management software like vCloud Director etc., to indicate demarcation between the different tenants. However, this approach merely creates an abstract layer for the customers, who may have no idea of the underlying technology. If each tenant has to authenticate their VMs that are part of the vApp, each tenant may have to be authenticated by a distinct AAA server within the network.

In another example, a child domain per user may be implemented within the tenant zone. A trust relationship may be established with the child domain. When there are trust relationships between domains, the authentication mechanism for each domain trusts the authentication mechanism for all other trusted domains. If a user is authenticated by one domain, the authentication is accepted by all other domains that trust the authenticating domain. Users in a trusted domain have access to resources in the trusting domain, subject to the access controls that are applied in the trusting domain.

However, such mechanisms cannot be implemented successfully for individual users because current sign-on technologies, such as Microsoft Active Directory Federation Services (ADFS) used in the cloud infrastructure allow users to access their virtual desktops in a transparent single sign-on way, but create shadow accounts that are part of the backend cloud infrastructure. Sessions started within the security context of such shadow accounts cannot access tenant side backend infrastructures. Moreover, for various security reasons, tenants may balk at providing user authentication information to their service providers for establishing the trust relationship.

Communication system 10 is configured to address these issues (and others) in offering a system and method for identity based authentication in a distributed virtual switch network environment. Embodiments of communication system 10 may forward user credentials 32(1)-32(R) from VMs 16(1)-16(M) to AAA servers 26(1)-26(N) outside DVS network 14, receive user policy 34(1)-34(R) from AAA servers 26(1)-26(N) and facilitate enforcement of user policy 34(1)-34(R) within DVS network 14. NACs 24(1)-24(N) may be controlled (e.g., licensed) by respective tenants 12(1)-12(N) within DVS network 14. Likewise, AAA servers 26(1)-26(N) may be controlled by respective tenants 12(1)-12(N). In one embodiment, AAA servers 26(1)-26(N) may be located outside DVS network 14, for example, within respective tenants' internal networks.

For ease of illustration, and not as a limitation, assume that user 30(1) belongs to tenant 12(1) (e.g., user 30(1) is an employee of tenant 12(1), which is an enterprise), and is authorized to access a customized virtual desktop on VM 16(1). User 30(1) may access DVS network 14 across a public cloud, such as the Internet. In one embodiment, when user 30(1) logs on to VM 16(1), VM 16(1) may forward the user's logon information (e.g., user name and password) to VEM 20(1) through a 802.1X packet. 802.1X protocol has a number of modes of operation, and a common case would include the following operations: (1) VM 16(1) may send an "Extensible Authentication Protocol (EAP) Identity" packet to NAC 24(1), which is then passed on to AAA server 26(1); (2) AAA server 26(1) may send back a challenge to NAC 24(1), such as with a token password system and NAC 24(1) may unpack the challenge and forward it on to VM 16(1); (3) VM 16(1) may respond to the challenge via NAC 24(1); and (4) if VM 16(1) has provided proper identity, AAA server 26(1) may respond with a success message, which is then passed onto VM 16(1). The response from AAA server 26(1) may include attributes that encompass user policy 34(1). NAC 24(1) may subsequently allow access to DVS network 14, restricted based on user policy 34(1). AAA server 26(1) may be suitably configured with authentication and authorization information for various users by tenant 12(1), based on particular needs.

In various embodiments, NAC 24(1) may use vPath 22(1) to enforce user policy 34(1) within DVS network 14. For every new flow, vPath 22(1) may intercepts the flow, encapsulate the first packet and send it to a VSG as specified in a port profile associated with vNIC 18(1) of VM 16(1). The VSG may inspect the packet, apply appropriate policies from user policy 34(1) and send a policy decision to vPath 22(1). vPath 22(1) may cache the policy decision in a flow table. In various embodiments, vPath 22(1) may be aware of substantially all Layer 4-7 policies associated with VM 16(1). After the data packets of VM 16(1) have been identified and policies (e.g., user policy 34(1) and/or port profiles of vNIC 18(1)) applied, the remaining data packets can flow directly to VM 16(1) and other components of DVS network 14 based on particular needs.

For example, packets from and to VM 16(1) may be inspected in vPath 22(1) by VEM 20(1). If the packets are to and/or from authorized services according to user policy 34(1) (and as specified by the policy decision from the VSG), VEM 20(1) may forward the packets appropriately. Otherwise, the packets may be dropped, and/or other error messages and actions may be initiated. In another use scenario, if user 30(1) has authorization to access only VLAN A based on user policy 34(1), any attempt to access VLAN B, for instance, may result in an error message. User policy 34(1) may be applied to substantially all traffic to and from VM 16(1) by user 30(1). Further, when user 30(2) logs on to VM 16(1), a different user policy 34(2) may apply to traffic to and from VM 16(1).

Embodiments of communication system 10 can permit each tenant to configure resources within DVS network 14 according to user credentials. For example, an IT administrator of the tenant may get access to substantially all subscribed-for resources within DVS network 14; a human resources department employee may get access to only a portion of the subscribed-for resources. Moreover, each resource may be customizable based on user configuration and other settings. Different users may customize resources differently. Each user's experience of resources within DVS network 14 may thus be customized, distinct, and secure. Because NACs 24(1)-24(N) and corresponding AAA servers 26(1)-26(N) can be controlled by respective tenants 12(1)-12(N), each tenant may be assured of the security of the authentication, even though the underlying infrastructure of DVS network 14 is shared between multiple tenants.

In some embodiments, DVS network 14 may include a separate AAA server (or other authentication mechanisms) to authenticate tenants separately to DVS network 14. Thus, users 30(1)-30(R) may log on to DVS network 14, and the network authentication mechanism may identify the users as belonging to specific tenants. Subsequently, users 30(1)-30(R) may log into specific VMs 16(1)-16(M), triggering the operations described herein. In other embodiments, users 30(1)-30(R) may log into specific VMs 16(1)-16(M) concurrently with DVS network 14. Thus, authentication mechanisms of DVS network 14 may be performed substantially simultaneously with the operations described herein.

Turning to the infrastructure of communication system 10, the network topology can include any number of servers, virtual machines, switches (including distributed virtual switches), routers, and other nodes inter-connected to form a large and complex network. A node may be any electronic device, client, server, peer, service, application, or other object capable of sending, receiving, or forwarding information over communications channels in a network. Elements of FIG. 1 may be coupled to one another through one or more interfaces employing any suitable connection (wired or wireless), which provides a viable pathway for electronic communications. Additionally, any one or more of these elements may be combined or removed from the architecture based on particular configuration needs. Communication system 10 may include a configuration capable of TCP/IP communications for the electronic transmission or reception of data packets in a network. Communication system 10 may also operate in conjunction with a User Datagram Protocol/Internet Protocol (UDP/IP) or any other suitable protocol, where appropriate and based on particular needs. In addition, gateways, routers, switches, and any other suitable nodes (physical or virtual) may be used to facilitate electronic communication between various nodes in the network.

Note that the numerical and letter designations assigned to the elements of FIG. 1 do not connote any type of hierarchy; the designations are arbitrary and have been used for purposes of teaching only. Such designations should not be construed in any way to limit their capabilities, functionalities, or applications in the potential environments that may benefit from the features of communication system 10. It should be understood that communication system 10 shown in FIG. 1 is simplified considerably for ease of illustration.

The example network environment may be configured over a physical infrastructure that may include one or more networks and, further, may be configured in any form including, but not limited to, local area networks (LANs), wireless local area networks (WLANs), VLANs, metropolitan area networks (MANs), wide area networks (WANs), virtual private networks (VPNs), Intranet, Extranet, any other appropriate architecture or system, or any combination thereof that facilitates communications in a network. In some embodiments, a communication link may represent any electronic link supporting a LAN environment such as, for example, cable, Ethernet, wireless technologies (e.g., IEEE 802.11x), ATM, fiber optics, etc. or any suitable combination thereof. In other embodiments, communication links may represent a remote connection through any appropriate medium (e.g., digital subscriber lines (DSL), telephone lines, T1 lines, T3 lines, wireless, satellite, fiber optics, cable, Ethernet, etc. or any combination thereof) and/or through any additional networks such as a wide area networks (e.g., the Internet).

In various embodiments, NACs 24(1)-24(N) may be applications (e.g., computer programs) running on network elements, such as servers, and line cards of routers or switches. In some embodiments, NACs 24(1)-24(N) may be implemented as a VM on one or more servers. When implemented as a VM, a separate software license may be associated with respective NACs 24(1)-24(N). Moreover, NACs 24(1)-24(N) may be configurable by respective tenants 12(1)-12(N) to communicate with respective AAA servers 26(1)-26(N). For example, NAC 24(1) may be configured with the IP address of corresponding AAA server 26(1), so that NAC 24(1) can initiate and maintain connection with AAA server 26(1).

In various embodiments, VEMs 20(1)-20(P) and corresponding vPath 22(1)-22(P) may be applications implemented on respective servers or other suitable network elements. VEMs 20(1)-20(P) and vPath 22(1)-22(P), along with vNICs 18(1)-18(M) may be part of a distributed virtual switch spanning DVS network 14. The distributed virtual switch can deliver highly secure, multi-tenant services in the data center network. These soft-switches may be integrated with other applications, such as VMware® vCloud Director.

Figure 2:
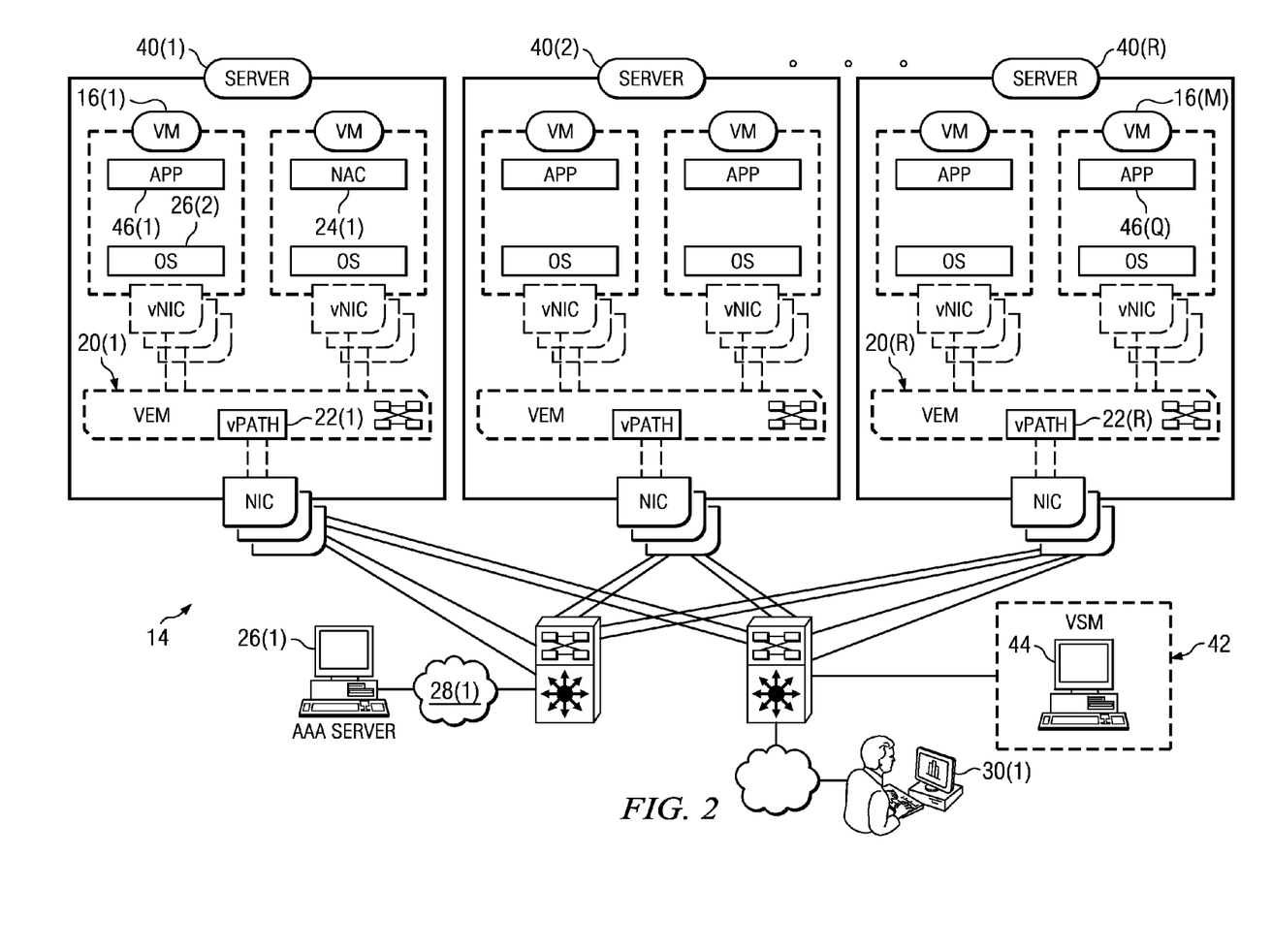
FIG. 2 is a simplified block diagram illustrating example details of the communication system in accordance with one embodiment.

Turning to FIG. 2, FIG. 2 is a simplified block diagram illustrating example details of an embodiment of communication system 10. DVS network 14 may span many servers 40(1)-40(R), which may be provisioned with respective VEMs 20(1)-20(R). VEMs 20(1)-20(R) may provide advanced networking capability to one or more VMs 16(1)-16(M). DVS network 14 may be provisioned with a Virtual Supervisor Module (VSM) 42 that controls VEMs 20(1)-20(R) as one virtual switch. VEMs 20(1)-20(R) may be configured through VSM 42 to perform Layer 2 switching and advanced networking functions, such as port-channels, quality of service (QoS), security (e.g., private virtual local area network (VLAN), port security, etc.), and monitoring (e.g., net-flow, switch port analyzer (SPAN), encapsulated remote SPAN, etc.). Network administrators can define configurations on all VEMs 16(1)-16(M) in DVS network 14 from a single interface coupled to VSM 42. In the embodiment illustrated in FIG. 2, VSM 42 may be integrated with a server 44 that provides a single console to operate and manage VSM 42.

Multiple VMs 16(1)-16(M) each running its own operating system (OS) may exist in any one or more servers 40(1)-40(R). Applications 46(1)-46(Q) may run on VMs 16(1)-16(M) in DVS network 14. Applications 46(1)-46(Q) may include web services that run on dedicated web servers, application services that run on dedicated application servers, and database services that run on dedicated database servers. In one embodiment, NAC 24(1) may be implemented as an application in server 40(1). NAC 24(1) may communicate with AAA server 26(1) over external network 28(1).

Assume, for the sake of illustration, and not as a limitation, that user 30(1) is associated with tenant 12(1), which subscribes to NAC 24(1) and VM 16(M) in DVS network 14, and manages AAA server 26(1) in its own separate network. During operation, when user 30(1) attempts to log into VM 16(M), VM 16(M) may send user credentials 32(1) to VEM 20(R) (to which VM 16(M) is connected on server 40(R)) in a 802.1X packet. VEM 20(R) may inspect the packet and route it through vPath 22(R) to NAC 24(1) in server 40(1). NAC 24(1) may forward user credentials 32(1) to AAA server 26(1) over external network 28(1). AAA server 26(1) may respond with user policy 34(1), authenticating user 30(1), and authorizing certain network resources. According to an embodiment, NAC 24(1) may generate a hash of user credentials 32(1) and forward it to VEM 20(R). In addition, user policy 34(1) may also be forwarded to VEM 20(R). After user 30(1) successfully logs onto VM 16(M), user 30(1) may attempt to access other services within DVS network 14. For example, user 30(1) may attempt to access a file within a specific VLAN. VEM 20(R) may determine from user policy 34(1) and/or hashed user credentials, whether user 30(1) is authorized to access the requested VLAN. Thus, traffic initiated by user 30(1) may be tracked, logged, monitored, and otherwise acted on according to user policy 34(1).

Other NACs and AAA servers are not shown in FIG. 2, for ease of illustration. Other NACs may be implemented in DVC network 14, for example, configured separately for each of tenants 12(1)-12(N), within the broad scope of the embodiments. Likewise, each of the other NACs may communicate with corresponding AAA servers suitably, based on particular needs.

Figure 3:
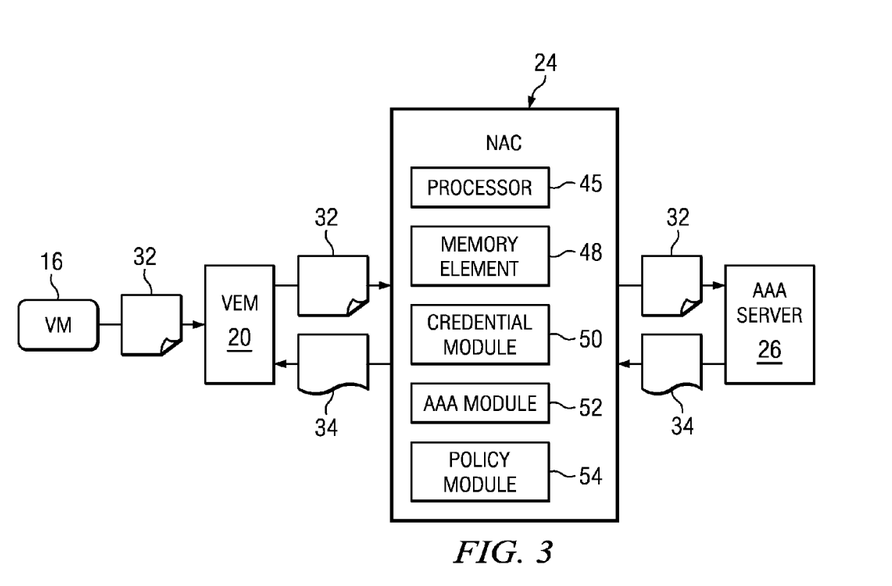
FIG. 3 is a simplified block diagram illustrating other example details of the communication system in accordance with another embodiment.

Turning to FIG. 3, FIG. 3 is a simplified block diagram illustrating example details of an embodiment of communication system 10. Representative NAC 24 includes a processor 45, a memory element 48, a credential module 50, an AAA module 52, and a policy module 54. Representative VM 16 may send representative user credentials 32 to representative VEM 20. VEM 20 may forward user credentials 32 to NAC 24. Credential module 50 may receive user credentials 32 and identify the packet as an authentication packet (e.g., 802.1X, WebAuth, MAB, etc.). AAA module 52 may forward user credentials 32 to representative AAA server 26. AAA server 26 may respond with representative user policy 34. Policy module 54 may receive user policy 34 and facilitate enforcement of user policy 34 across DCV network 14. For example, policy module 54 may forward user policy 34 to VEM 20 for further processing, such as determining access to other network services. If no user policy 34 is received by NAC 24, a default all-access allowed policy may be enforced for the user.

Prior to authentication, the user's identity may be unknown to DVS network 14. For running 802.1X protocol, VM 16 may be configured with a suitable client that can submit user credentials 32 for authentication as a supplicant. Clients can be software applications, or they can be embedded in the operating system, or hardware. NAC 24 can act as an authenticator, facilitating the authentication process by relaying the supplicant's user credentials 32 to AAA server 26. AAA server 26 may validate the supplicant's user credentials 32 and determine what network access the supplicant should receive. In one embodiment, AAA server 26 may be a RADIUS server. AAA server 26 may query backend identity databases to validate user credentials 32 and send user policy 34. Typical backend databases include Microsoft Active Directory, Novell eDirectory, and Lightweight Directory Access Protocol (LDAP). VM 16, NAC 24 and AAA server 26 may also use public key infrastructure (PKI) to enable the authentication process, for example, through suitable digital certificates. In various embodiments, VM 16 may send user credentials 32 to NAC 24 using EAP over LAN (EAPoL) if the transport is over IEEE 802 wired networks. NAC 24 may extract user credentials 32 from the packet sent by VM 16, and encapsulate it inside a Layer 4 RADIUS packet before forwarding on to AAA server 26.

Protocols other than 802.1X can also be used within the broad scope of the present disclosure. For example, access to specific applications (e.g., web pages) may be enabled through WebAuth protocols. WebAuth is an authentication system for web pages and web applications. The first time a user attempts to access a web page protected by WebAuth, the user may be prompted to authenticate. The web page may reside on a specific VM 16 in DVS network 14. The user may be asked for a username and password, although other authentication methods are possible. In another example, MAC authentication bypass (MAB) may be used to provide controlled access to VMs based on their MAC addresses.

Figure 4:
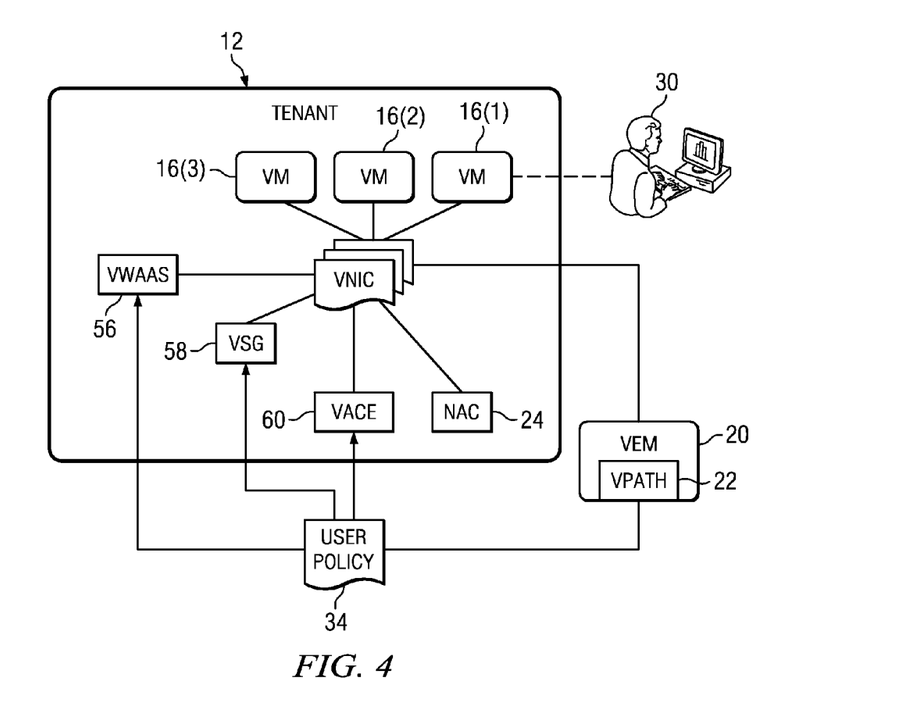
FIG. 4 is a simplified block diagram illustrating yet other example details of the system in accordance with yet another embodiment of the communication system.

Turning to FIG. 4, FIG. 4 is a simplified block diagram illustrating example details of an embodiment of communication system 10. Representative tenant 12 may subscribe to multiple VMs 16(1)-16(3), NAC 24, and network service applications vWAAS 56, VSG 58, and vACE 60. Representative user 30 may be authorized to access only vWAAS 56, and VM 16(1). User 30's authorized services may be indicated in user policy 34. In one embodiment, user policy 34 may be propagated by representative vPath 22 to VSG 58. When a packet with an unknown destination (e.g., vACE 60) is received from VM 16(1) at representative VEM 20, vPath 22 may forward the packet to VSG 58. VSG 58 may determine from user policy 34 that user 30 does not have access to vACE 60. Subsequent packets from VM 16(1) destined to vACE 60 may be dropped by vPath 22. When an unknown packet from VM 16(1) is received at VEM 20 and destined to vWAAS 56, vPath 22 may forward the packet to VSG 58. VSG 58 may determine from user policy 34 that user 30 has access to vWAAS 56. Subsequent packets from VM 16(1) destined to vWAAS 56 may be forwarded to vWAAS 56 by vPath 22. VSG 58 may also apply access controls indicated in user policy 34 to user 30's access of VLANs and other services.

User policy 34 includes network configuration information based on user credentials 32, including user profiling, user workspace management, and user identity management. User profiling refers to logging user activities within DVS network 14. User workspace management refers to managing the workspace authorized to be used by the user, including desktops, files, directories, VLAN, VXLANs, etc. User identity management refers to managing individual user identities, including their authentication and authorization, and privileges and permissions within DVS network 14. User policy 34 may specify whether and to what extent user profiling may be performed (e.g., user's activities within a human resources directory may be logged, whereas the user's activities in an IT VLAN may not be logged). User policy 34 may specify the workspace (e.g., number of VMs 16(1)-16(3), storage and compute resources, etc.) authorized to be used by the user. User policy 34 may also specify the privileges and permissions associated with the user, such as the network services accessible by the user, specific VLANs permitted to be used by the user, etc.

Figure 5:
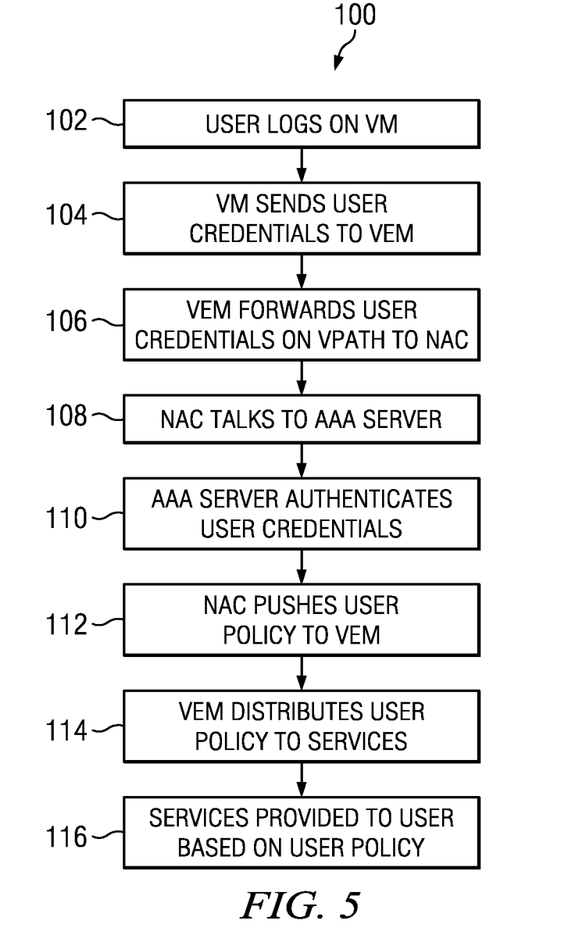
FIG. 5 is a simplified flow diagram illustrating example operations that may be associated with an embodiment of the communication system.

Turning to FIG. 5, FIG. 5 is a simplified flow diagram illustrating example operations that may be associated with an embodiment of communication system 10. Operations 100 may include 102, at which user 30 attempts to log into VM 16 using certain credentials, such as username and password. At 104, VM 16 may send user credentials 32 to associated VEM 20. At 106, VEM 20 may forward user credentials 32 on vPath 22 to NAC 24. At 108, NAC 24 may talk to AAA server 26 and forward user credentials 32. At 110, AAA server 26 may authenticate user credentials 32 and respond with user policy 34. At 112, NAC 24 may push user policy 34 to VEM 20. VEM 20 may distribute user policy 34 to services (e.g., VSG 58) at 114. The services may be provided to user 30 based on user policy 34 (shown in 116).

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments. Note also that an "application" as used herein this Specification, can be inclusive of an executable file comprising instructions that can be understood and processed on a computer, and may further include library modules loaded during execution, object files, system files, hardware logic, software logic, or any other executable modules.

In example implementations, at least some portions of the activities outlined herein may be implemented in software in, for example, NACs 24(1)-24(N). In some embodiments, one or more of these features may be implemented in hardware, provided external to these elements, or consolidated in any appropriate manner to achieve the intended functionality. The various network elements (e.g., NACs 24(1)-24(N), VEMs 20(1)-20(R), VMs 16(1)-16(M)) may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, NACs 24(1)-24(N), VEMs 20(1)-20(R), VMs 16(1)-16(M) described and shown herein (and/or their associated structures) may also include suitable interfaces for receiving, transmitting, and/or otherwise communicating data or information in a network environment. Additionally, some of the processors and memory elements associated with the various nodes may be removed, or otherwise consolidated such that a single processor and a single memory element are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memory elements (e.g., memory element 48) can store data used for the operations described herein. This includes the memory element being able to store instructions (e.g., software, logic, code, etc.) in non-transitory computer readable media, such that the instructions are executed to carry out the activities described in this Specification. A processor can execute any type of instructions associated with the data to achieve the operations detailed herein in this Specification. In one example, processors (e.g., processor 45) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

These devices may further keep information in any suitable type of non-transitory storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in communication system 10 could be provided in any database, register, table, cache, queue, control list, or storage structure, based on particular needs and implementations, all of which could be referenced in any suitable timeframe. Any of the memory items discussed herein should be construed as being encompassed within the broad term "memory element." Similarly, any of the potential processing elements, modules, and machines described in this Specification should be construed as being encompassed within the broad term "processor."

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, communication system 10 may be applicable to other exchanges or routing protocols. Moreover, although communication system 10 has been illustrated with reference to particular elements and operations that facilitate the communication process, these elements, and operations may be replaced by any suitable architecture or process that achieves the intended functionality of communication system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method executed by a network access control (NAC) in a distributed virtual switch (DVS) network environment, comprising:
   forwarding user credentials from a virtual machine (VM) in the DVS network environment to a network element located outside the DVS network environment, wherein the user credentials relate to a user attempting to access the VM, wherein a plurality of tenants subscribe to one or more VMs hosted in the DVS network and the tenants share underlying infrastructure of the DVS network, wherein each tenant controls a separate NAC and a separate network element that can assure security of user authentication relevant to the tenant;
   receiving a user policy at the NAC from the network element, wherein the network element is configured with the user policy by a tenant controlling the NAC and the network element; and
   facilitating enforcement of the user policy within the DVS network environment.

2. The method of claim 1, wherein the user credentials are provided in a 802.1X packet, and wherein the network element is an Authentication, Authorization, and Accounting (AAA) server.

3. The method of claim 1, wherein the user policy includes information related to access control lists (ACLs), virtual local area networks (VLANs), virtual eXtensible local area networks (VXLANs), and security groups that are authorized to be accessed by the user.

4. The method of claim 1, wherein the user policy comprises network configuration information based on the user credentials, including user profiling, user workspace management, and user identity management.

5. The method of claim 1, wherein the network access control (NAC) in the DVS network environment facilitates the enforcement of the user policy through a vPath module that runs virtualized services in the DVS network, wherein the vPath intercepts new flows and forwards a packet of each new flow to a virtual security gateway (VSG) that applies appropriate policies from the user policy and sends a policy decision to the vPath, wherein the vPath caches the policy decision and enforces the policy decision for subsequent packets of the flows.

6. The method of claim 5, wherein the NAC is provisioned as another VM in the DVS network environment.

7. The method of claim 5, wherein the network element is located at another network controlled by the tenant.

8. The method of claim 1, wherein facilitating enforcement of the user policy comprises forwarding the user policy to a virtual Ethernet module (VEM) that can enforce the user policy.

9. Logic encoded in non-transitory media that includes instructions for execution and when executed by a processor, is operable to perform operations comprising:
   forwarding, by a NAC in the DVS, user credentials from a VM in a DVS network environment to a network element outside the DVS network environment, wherein the user credentials relate to a user attempting to access the VM, wherein a plurality of tenants subscribe to one or more VMs hosted in the DVS network and the tenants share underlying infrastructure of the DVS network, wherein each tenant controls a separate NAC and a separate network element that can assure security of user authentication relevant to the tenant;
   receiving a user policy at the NAC from the network element, wherein the network element is configured with the user policy by a tenant controlling the NAC and the network element; and
   facilitating enforcement of the user policy within the DVS network environment.

10. The logic of claim 9, wherein the user credentials are provided in a 802.1X packet, and wherein the network element is an Authentication, Authorization, and Accounting (AAA) server.

11. The logic of claim 9, wherein the user policy includes information related to ACLs, VLANs, VXLANs, and security groups that are authorized to be accessed by the user.

12. The logic of claim 9, wherein the NAC facilitates the enforcement of the user policy through a vPath module that runs virtualized services in the DVS network, wherein the vPath intercepts new flows and forwards a packet of each new flow to a virtual security gateway (VSG) that applies appropriate policies from the user policy and sends a policy decision to the vPath, wherein the vPath caches the policy decision and enforces the policy decision for subsequent packets of the flows.

13. The logic of claim 12, wherein the NAC is provisioned as another VM in the DVS network environment.

14. The logic of claim 12, wherein the network element is located at another network controlled by the tenant.

15. An apparatus, comprising:
   a memory element for storing data; and
   a processor that executes instructions associated with the data, wherein the processor and the memory element cooperate, such that the apparatus is configured to:
      forward user credentials, by a NAC in a DVS network environment to a network element outside the DVS network environment, wherein the user credentials relate to a user attempting to access a virtual machine (VM), wherein a plurality of tenants subscribe to one or more VMs hosted in the DVS network and the tenants share underlying infrastructure of the DVS network, wherein each tenant controls a separate NAC and a separate network element that can assure security of user authentication relevant to the tenant;

receive a user policy at the NAC from the network element, wherein the network element is configured with the user policy by a tenant controlling the NAC and the network element; and facilitate enforcement of the user policy within the DVS network environment.

16. The apparatus of claim 15, wherein the user credentials are provided in a 802.1X packet, and wherein the network element is an Authentication, Authorization, and Accounting (AAA) server.

17. The apparatus of claim 15, wherein the user policy includes information related to ACLs, VLANs, VXLANs, and security groups that are authorized to be accessed by the user.

18. The apparatus of claim 15, wherein the NAC facilitates the enforcement of the user policy through a vPath module that runs virtualized services in the DVS network, wherein the vPath intercepts new flows and forwards a packet of each new flow to a virtual security gateway (VSG) that applies appropriate policies from the user policy and sends a policy decision to the vPath, wherein the vPath caches the policy decision and enforces the policy decision for subsequent packets of the flows.

19. The apparatus of claim 18, wherein the NAC is provisioned as another VM in the DVS network environment.

20. The apparatus of claim 18, wherein the network element is located at another network controlled by the tenant.

* * * * *